US011349165B2

United States Patent
Shao et al.

(10) Patent No.: US 11,349,165 B2
(45) Date of Patent: May 31, 2022

(54) CONTROL LOGIC FOR A BATTERY COOLING SYSTEM

(71) Applicant: Baidu USA LLC, Sunnyvale, CA (US)

(72) Inventors: Shuai Shao, Milpitas, CA (US); Huawei Yang, San Jose, CA (US); Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 206 days.

(21) Appl. No.: 16/665,976

(22) Filed: Oct. 28, 2019

(65) Prior Publication Data

US 2021/0126304 A1    Apr. 29, 2021

(51) Int. Cl.
| | |
|---|---|
| *H01M 10/6568* | (2014.01) |
| *H01M 10/625* | (2014.01) |
| *H01M 10/637* | (2014.01) |
| *H01M 10/613* | (2014.01) |
| *H01M 10/627* | (2014.01) |

(52) U.S. Cl.
CPC ..... *H01M 10/6568* (2015.04); *H01M 10/613* (2015.04); *H01M 10/625* (2015.04); *H01M 10/627* (2015.04); *H01M 10/637* (2015.04)

(58) Field of Classification Search
None
See application file for complete search history.

(56) References Cited

U.S. PATENT DOCUMENTS

| | | |
|---|---|---|
| 2011/0027640 A1 | 2/2011 | Gadawski et al. |
| 2015/0037647 A1 | 2/2015 | Nguyen et al. |
| 2016/0157388 A1 | 6/2016 | Belady et al. |
| 2017/0181326 A1* | 6/2017 | Shelnutt ............ H05K 7/20772 |
| 2017/0229747 A1 | 8/2017 | Jung et al. |

* cited by examiner

*Primary Examiner* — Lisa S Park
(74) *Attorney, Agent, or Firm* — Womble Bond Dickinson (US) LLP (57) ABSTRACT

According to one embodiment, a battery cooling system includes a battery module with cells, liquid pumps, and a heat exchanger. A method, in response to the battery module discharging battery energy, sets a first liquid pump that is configured to push a first liquid coolant warmed by heat generated by the cells into a hot side of the heat exchanger to a first pump speed, and sets a second liquid pump that is configured to push a second liquid coolant into a cold side of the heat exchanger to a second pump speed. The method determines at least one of an adjusted first and second pump speeds by optimizing an objective function based on the first and second pump speeds, a battery discharge current, and a temperature of the second liquid coolant. The objective function is to minimize the power consumption of the system's cooling components which are the first and the second pumps according to one embodiment. The method modifies at least one of the first and second pump speeds according to the adjusted speeds.

20 Claims, 5 Drawing Sheets

CONTROL LOGIC FOR A BATTERY COOLING SYSTEM

FIELD

Embodiments of the present disclosure relate generally to a battery cooling system. More particularly, embodiments of the disclosure relate to controlling liquid pumps of the battery cooling system.

BACKGROUND

A battery backup unit (BBU) is used as a backup power source or an energy storage device for applications such as data centers. A battery pack consists of battery cells connected in series, in parallel or, a combination of both. The battery cells generate heat during discharging and charging. The speed of discharging is positively correlated with the heat generated. Since multiple cells are connected together, a significant difference in internal temperature values can lead to different charging and discharging rates for different cells and thus cause the battery pack performance to deteriorate. Therefore, a battery thermal management system plays a vital role in the design and operation of the battery pack, and has a direct impact on the performance of the battery pack. In addition, a bad design of a thermal system may result in the battery failing to function, such as failure to satisfy the backup time needed. Several conventional battery thermal management systems for cooling electric vehicles exist. These include, for example, the air cooling system, the passive or active liquid system, and the thermoelectric system. However, such systems are insufficient.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a method for controlling several liquid pumps of a battery cooling system that includes a battery module that has a set of battery cells and a liquid-to-liquid heat exchanger. The method includes, in response to an indication that the battery module has begun to either discharge battery energy stored in the set of battery cells to a load or draw power from an external power supply to charge the battery cells, 1) setting a first pump speed for a first liquid pump that is configured to push a first liquid coolant that at least partially submerges the battery cells and is warmed by heat generated by the battery cells into a hot side of the liquid-to-liquid heat exchanger, and 2) setting a second pump speed for a second liquid pump that is configured to push a second liquid coolant into a cold side of the liquid-to-liquid heat exchanger, wherein the heat exchanger is configured to transfer heat from the first liquid coolant into the second liquid coolant. The method determines a battery discharge current from the battery module and a temperature of the second liquid coolant. The method determines at least one of an adjusted first pump speed and an adjusted second pump speed by optimizing an objective function based on the first pump speed, the second pump speed, the battery discharge current, and the temperature of the second liquid coolant. The method modifies at least one of the first pump speed and the second pump speed according to the adjusted first pump speed and the adjusted second pump speed, respectively.

In one embodiment, optimizing the objective function includes minimizing a sum of power consumed by the first liquid pump and the second liquid pump in view of one or more performance constraints. In another embodiment, the one or more performance include maintaining a temperature of the battery module below a threshold temperature. In some embodiments, the temperature of the battery module is a function of the first pump speed, the second pump speed, the battery discharge current, and the temperature of the second liquid coolant. In another embodiment, the method further includes iteratively performing the determining the battery discharge current and the temperature, the determining the adjusted first and second pump speeds, and the modifying the first and second pump speeds, while the battery module either discharges the battery energy or draws the power in order to ensure that the temperature of the battery module is maintained below the threshold temperature.

In one embodiment, the battery module is a battery backup unit (BBU) in a data center that is configured to provide battery backup power to one or more pieces of IT equipment. In another embodiment, the method further includes measuring the temperature of the second liquid coolant before the liquid-to-liquid heat exchanger transfers heat from the first liquid coolant into the second liquid coolant.

In some embodiments, optimizing the objective function includes maintaining a battery module temperature below a threshold temperature without performing a direct temperature measurement of the battery module.

According to another embodiment, a battery cooling system includes a battery module that includes a set of battery cells that are at least partially submerged within a first liquid coolant, where the set of battery cells are configured to provide battery energy to a load and are configured to draw power from an external power supply to charge the battery cells. The system also includes a liquid-to-liquid heat exchanger, a first liquid pump that is configured to push the first liquid coolant from the battery module into a hot side of the heat exchanger, and a second liquid pump that is configured to push a second liquid coolant from an external cooling source into a cold side of the heat exchanger. The system also includes at least one processor and memory having instructions stored therein which when executed by the at least one processor causes the system to perform at least some of the operations described herein.

According to another embodiment, a non-transitory machine-readable medium having instructions stored therein which when executed by a processor causes the processor to perform operations for controlling several liquid pumps of the battery cooling system described herein.

Cooling batteries, which generate heat during discharging and charging cycles can be critical because nominal battery performance is typically specified for working temperatures ranges of battery cells (e.g., 25° C. to 35° C.). Temperature also plays an important role with respect to battery aging. Temperatures outside of the working range may result in reduced performance and negatively impact battery health. In addition, when multiple battery cells are connected, there can be large internal differences between different cell temperatures, which can lead to different charge and discharge rates for each cell and deteriorate performance of the battery pack. Importantly, if battery temperature exceeds safety thermal limits, this can cause extreme damage or harm, even catastrophic results. Thus, cooling schemes (or methods) are important considerations in the design and operation of a battery because improper cooling may not only impact how a battery performs, but also the health, the lifetime, and the safety of the battery.

A backup battery unit (BBU) is used as a backup power source or an energy storage device for applications such as data centers. A battery pack consists of battery cells connected in series, in parallel or, a combination of both. The battery cells generate heat during discharging and charging. The speed of discharging is positively correlated with the heat generated. In a particular embodiment, a battery cooling system (or battery thermal management system) may include one or more battery cells immersed in cooling liquid contained in an immersion tank. A cooling system for the battery pack is very important because a higher temperature or a lower temperature may negatively impact the battery performance as well as battery health conditions. Since multiple cells are connected together, a significant difference in internal temperature values can lead to different charging and discharging rates for different cells and thus cause the battery pack performance to deteriorate. Therefore, the battery cooling system plays a vital role in the design and operation of the battery pack, and has a direct impact on the performance of the battery pack. In addition, a bad design of a cooling system may result in the battery failing to function, such as failure to satisfy the backup time needed. Several conventional battery thermal management systems for cooling electric vehicles exist. These include, for example, the air cooling system, the passive or active liquid system, and the thermoelectric system. However, such systems are insufficient.

Advanced thermal management for battery energy storage in data center applications including immersion cooling may require a dedicated control logic for an optimized controller. Previous attempts to regulate the temperature of a battery in such a scenario have provided cooling control logic with the feedback of battery temperature. These previous attempts have relied on the battery temperature as feedback to then determine the speed of the cooling engines (e.g., fans, pumps, etc.). However, for advanced battery cooling systems (e.g., immersion cooling), the thermal mass of the battery or batteries may be relatively high. This may result in the variation of the temperature to be delayed compared to the variation of the heat generated by the battery. This may result in the actual heat experienced by the battery to occur much sooner than what the feedback of the system indicates. The delay in the feedback may cause the battery to become too hot before the system can cool it. A low-latency control algorithm may be necessary to prevent this from occurring.

Embodiments of the present disclosure present a controller with no need of real-time feedback of battery temperature. This reduces latency significantly. Embodiments of the present disclosure introduce a controller to achieve thermal management of one or more battery modules (e.g., in a battery backup unit) for data center applications. The controller may balance the need for cooling the battery modules with the aim of reducing energy consumption. The energy may be consumed by at least two pumps within the battery system.

The battery or batteries may be used as a backup power source or an energy storage device. The operation of the battery or batteries may have critical requirements such as an upper limit of working temperature. If the temperature of the battery rises above a threshold during discharge, the battery could fail. Thus, during discharge, it is important to cool the battery to prevent its temperature from rising above the threshold. The battery cooling system may (1) extract heat generated by the battery pack; (2) meet the operational requirements of the battery pack, such as ensuring that the temperature of the battery remains below its maximum working threshold temperature, such as 70° C.; and (3) reduce or minimize the power consumed by the pumps. These goals may be accomplished by a controller (or control logic) that allows the pumps to provide required cooling capacity while to minimizing or reducing the power consumption of pump power. The heat generated by the battery is transferred to a first liquid coolant. The first liquid coolant is circulated between a hot side of a liquid-to-liquid heat exchanger and the battery pack, thereby creating a primary cooling loop. The heat exchanger is liquid cooled, which transfers the heat from the circulating first liquid coolant to a second liquid coolant that is circulated between a cold side of the heat exchanger and an external cooling source (e.g., a cooling tower), which creates a secondary cooling loop. The heat exchanger transfers the heat from the first liquid coolant to the second liquid coolant. The battery temperature may need to be maintained below a threshold temperature as the overheating protection. To ensure overheating protection, pumps that enable the circulation of both liquid coolants within the primary and secondary cooling loops are controlled based on several constraints, such as a battery discharging current and a temperature of the second liquid coolant.

The current disclosure contemplates a battery cooling system that provides a new controller design based on a thermal and flow characterization of the system, to reach optimal energy cost of powering liquid pumps within the given constraints (e.g., maintaining battery temperature below a threshold temperature). The battery thermal management system may also provide a method for determining a relation between pump speeds of the liquid pumps, battery discharge current, and a temperature of the second liquid coolant, and battery temperature for a cooling system within the given constraints. Also, the battery thermal management system may accomplish the above without needing any real-time feedback of battery temperature. That is, no real-time feedback of battery temperature is needed for determining the working parameters of the battery thermal management system. Compared to the control methods with temperature feedback, the response time may be significantly lower. In addition, the current disclosure contemplates a method to determine the heat transfer performance of a heat exchanger used in the battery cooling system.

It should be mentioned that the phrase "battery pack" may be used herein interchangeably with "battery backup unit module (BBU module)" and with "BBU pack". Also, a BBU may include one or more battery modules (or battery packs). A battery module may include several battery cells. Other features are also described in the following examples.

Figure 1:
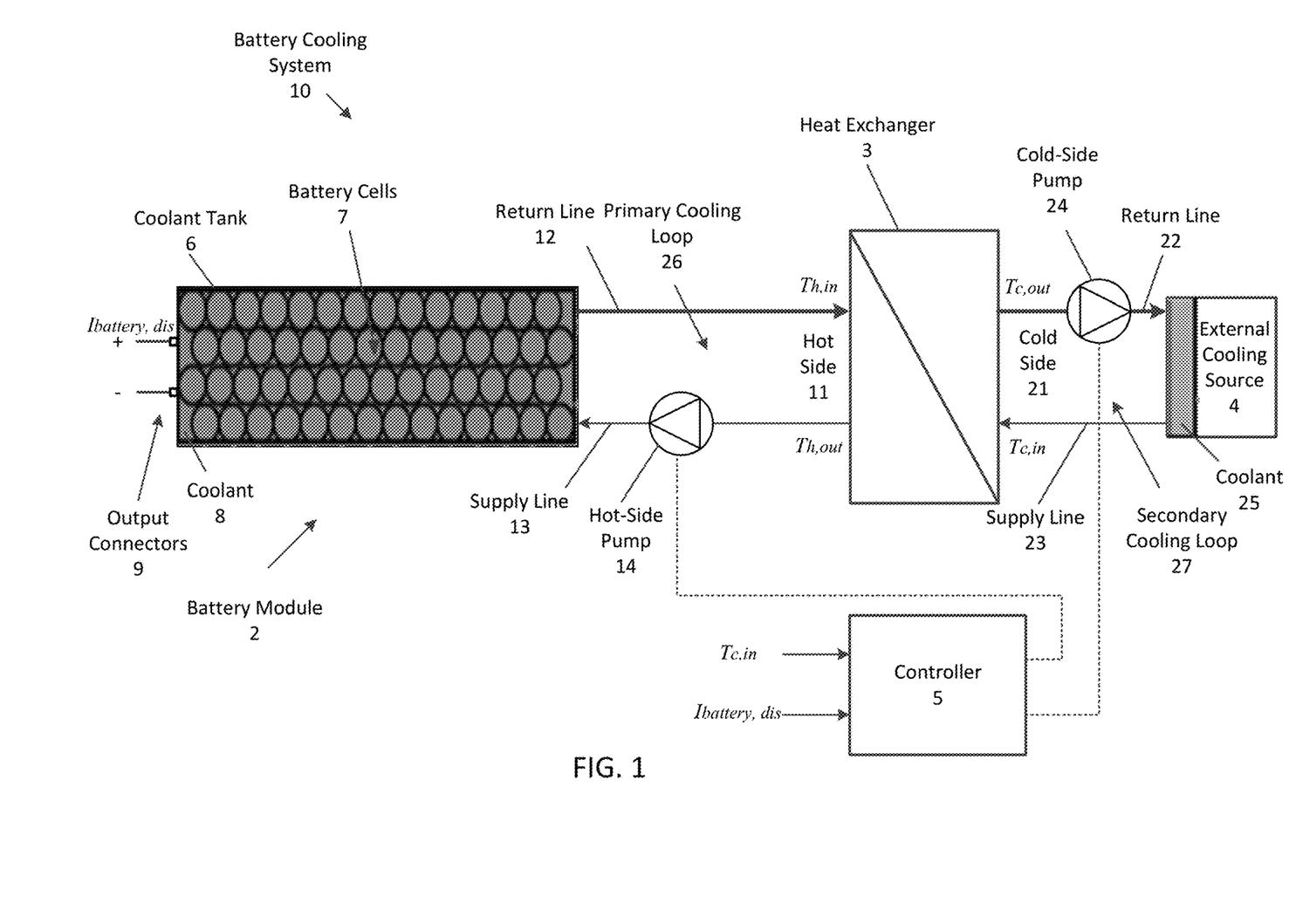
FIG. 1 is an example of a battery cooling system according to one embodiment.

FIG. 1 is a block diagram illustrating an example of a battery cooling system with a liquid-to-liquid heat exchanger according to one embodiment. Specifically, this figure shows a (top-down view of a) battery cooling system 10 (or battery thermal management system) with a battery module 2, a (e.g., liquid-to-liquid) heat exchanger 3, a hot-side liquid pump 14 (or first liquid pump), a cold-side liquid pump 24 (or second liquid pump), an external cooling source 4, and a controller 5. In one embodiment, the system 1 may include more or less elements as described herein. For example, the system may include two or more battery modules, each of which are coupled to the heat exchanger or separate heat exchangers.

The battery module 2 has a coolant tank 6 with one or more battery cells 7 and (first liquid) coolant 8. The tank may have any shape and configuration. For example, as illustrated, the tank is a rectangular container. In one embodiment, however, the tank may be a square or cylindrical container. In another embodiment, the tank includes one or more cells that are series connected, parallel connected, or a combination thereof, contained therein. The battery cells 7 may be of any type, such as Lithium-ion, Nickel Cadmium, etc. In one embodiment, the coolant tank 6 is an immersion tank, such that the battery cells are at least partially submerged within the coolant 8 in order to promote heat transfer from the cells into the coolant, as described herein. In another embodiment, the coolant 8 may be any type of liquid (or fluid), such as a dielectric liquid.

The battery module 2 also includes a pair of output connectors 9 (one anode and one cathode) that is coupled to the battery cells and is configured to couple to a load (e.g., the load may be at least one server) in order for the battery module to provide battery energy stored within the cells to the load via the output connectors. The connectors are also configured to couple the battery module to an external power supply (or source), such as an AC mains grid, in order for the battery module to draw power from the power source to charge the battery cells via the connectors. In one embodiment, the output connectors are configured to be removeably coupled to (e.g., connectors of) the load (or power source) in order to allow the battery module to be removed and/or added (in series or in parallel) to the load (or power source).

In one embodiment, the heat exchanger 3 is a liquid-to-liquid heat exchanger that is configured to transfer heat from one liquid to another liquid without the two liquids mixing together or coming into direct content (e.g., via tubes or plates). Specifically, the heat exchanger has a hot side 11 and a cold side 21. The heat exchanger is configured to receive coolant (e.g., coolant 8) via an inlet on the hot side 11, and is configured to receive coolant 25 via an inlet on the cold side 21. Inside the heat exchanger, heat contained within the coolant 8 passes to the coolant 25 (e.g., via a plate that separates the two liquids). As a result, the coolant 8 exits the heat exchanger via an outlet on the hot side, cooler, than the coolant 25 that exists the heat exchanger via an outlet on the cold side. In one embodiment, the liquid-to-liquid heat exchanger may be any type of heat exchanger. For instance, the heat exchanger may be a counter-flow heat exchanger or a cross-flow heat exchanger.

The external cooling source 4 is any source (or device) that is configured to extract heat from the coolant 25. For example, the source 4 may be a cooling tower or may be a data center cooling water system or an IT liquid cooling water system (not shown). As another example, the source may be another heat exchanger. In one embodiment, the source may be any type of source that is configured to cool the coolant 25.

As illustrated, the (coolant tank 6 of the) battery module 2 is coupled to the heat exchanger 3 via a return line 12 and a supply line 13, thereby creating a primary cooling loop 26. In addition, the external cooling source 4 is coupled to the heat exchanger via return line 22 and supply line 23, thereby creating a secondary cooling loop 27. Specifically, one end of lines 12 and 13 are coupled to the tank and another end of the lines 12 and 13 are coupled to a hot side (one side) 11 of the heat exchanger. Specifically, the ends of the lines 12 and 13 are coupled to the inlet/outlet of the hot side 11 of the heat exchanger, respectively. Similarly, one end of lines 22 and 23 are coupled to the source and another end of the lines 22 and 23 are coupled to a cold side (second side) 21 of the heat exchanger. In particular, the ends of the lines 22 and 23 are coupled to the outlet/inlet of the cold side 21 of the heat exchanger, respectively. Disposed on the supply line 13 is the hot-side liquid pump 14 that is configured to facilitate circulation of the coolant 8 through the primary cooling loop 26. Specifically, the pump 14 is configured to push the coolant 8 from the tank 6, through the return line 12, and into the heat exchanger. Similarly, the pump is configured to pull coolant from the heat exchanger, through the supply line and into the tank. In addition, disposed on the return line 22 is the cold-side liquid pump 24 that is configured to facilitate circulation of the coolant 25 through the secondary cooling loop 27. In particular, the pump 24 is configured to push coolant 25 from the source, through the supply line 23 into the heat exchanger, and pull coolant from the heat exchanger, through the return line 22 and into the source 4. In one embodiment, any of the pumps may be disposed on any of the lines. For instance, rather than pump being disposed on supply line 13, the pump may be disposed on the return line 12, or an additional pump may be disposed on the return line 12.

In one embodiment, any of the lines (e.g., 12, 13, 22, and/or 23) may be composed of any material. For instance, the lines may be composed of metal, such as copper, a polymer (e.g., a rubber), and/or plastic. In one embodiment, the lines may be composed of a flexible material, such as rubber. In another embodiment, one line (e.g., the supply line) may be composed of a different material than the other line (e.g., the return line). In one embodiment, the lines may be removeably coupled to any of the components described herein. For instance, the battery module may include connectors (a supply connector and/or return connector) that are configured to removeably couple to the supply line 13 and return line 12. As a result, both lines may be connected/disconnected from the battery module. In one embodiment, the heat exchanger and/or the source 4 may also include the connectors. In another embodiment, the connectors may be any type of connectors, such as quick-connect fittings that allow for easy connection/removal of the respective lines.

As described herein, the liquid-to-liquid heat exchanger 3 is configured to transfer heat contained within the coolant 8 into the coolant 25, in order to reduce the temperature of the coolant 8. For instance, while the battery module is active, meaning the module either discharges battery energy stored in the battery cells to a load or draws power from an external power supply to charge the battery cells, thermal energy is produced and absorbed by the coolant 8. In response, the pumps may be activated (e.g., by the controller 5) in order to begin circulating the coolant through both cooling loops. In particular, pump 14 pushes the coolant 8 that is warmed by the heat generated by the cells into the hot side 11 of the heat exchanger, via the return line 12, where the coolant has an inlet temperature at the hot side 11 of $T_{h,in}$. The heat exchanger transfers the heat from the coolant 8 to the coolant 25 that is being circulated by pump 24, and the coolant enters the supply line 13 having an outlet temperature $T_{h,out}$, which is lower than $T_{h,in}$. Thus, coolant 8 is cooled and returned to the coolant tank 8. Conversely, the coolant 25 enters the heat exchanger at an inlet temperature $T_{c,in}$, which is lower than an outlet temperature $T_{c,out}$ of the coolant as it exits the heat exchanger and into the return line 22 due to the transfer of heat.

The controller 5 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the controller may be a part of the battery module (e.g., contained within the module or coupled to the outside of the module), or may be communicatively coupled to a BBU pack that includes the module (e.g., may be a part of circuitry of a BBU pack or of an electronic rack that is holding the BBU pack). In another embodiment, the controller 5 may be communicatively coupled to both pumps 14 and 24. For instance, the controller may be directly wired to both pumps, or may be wirelessly coupled (e.g., via any wireless protocol, such as BLUETOOTH protocol).

In one embodiment, the controller 5 is configured to control the at least one of the pumps 14 and 24 (e.g., by transmitting a control signal to control circuitry of a pump, such as an electronic switch) in order to activate at least one of the cooling loops 26 and 27. The controller is also configured to minimize the amount of power consumed by the pumps, while ensuring that the temperature of the battery module does not exceed a threshold temperature. Specifically, while the battery is discharging battery energy into a load (e.g., a server), the power required to run the pumps is also drawn from the battery. Since the battery modules have a finite amount of energy (e.g., which may last as little as five minutes), it is imperative to maximize the amount of available power for the load. Thus, the controller includes a thermal management and power optimization algorithm that is configured to reach an optimal energy cost of powering the pumps to circulate coolant through both cooling loops within given performance constraints, such as maintaining battery temperature (e.g., the temperature of the battery module) below (or equal to) a threshold temperature. The algorithm may accomplish this without needing any real-time feedback of battery temperature. That is, the algorithm may determine (or estimate) the battery temperature based on a function of $I_{battery,dis}$, $T_{c,in}$, and the current pump speeds at which both pumps 14 and 24 are set. This is in contrast to conventional methods that require battery temperature measurement feedback. As a result, the present method may maximize the available battery power for the load, while having a response time that may be significantly lower. More about the operations performed by the algorithm is described herein.

The relationship between control variables (e.g., fan speed(s), pump speed(s)) and a target variable (e.g., battery temperature remaining below a threshold temperature) may be derived using a five-step formula that may be at least partially performed by the algorithm. The five-step formula may be used to provide a mathematical expression for the relation between the control variables and the target variable. Before discussing the five-step formula, it may be beneficial to provide a list of nomenclature. Table 1 provides a list of nomenclature for this disclosure.

TABLE 1

Nomenclature for this disclosure

| Name | Description |
|---|---|
| $P_{pump}$ | Pump power, W |
| T | Temperature, ° C. |
| $v_{pump}$ | Pump speed, RPM |
| $R_{battery}$ | The internal resistance of battery pack, ° C./W |
| ε | Heat exchanger effectiveness |
| $C_{min}$ | Smaller of the two fluid stream capacities, fluid capacitance, J/K |
| $c_p$ | Specific heat capacity of fluid stream, J/(kgK) |
| V | Volumetric flow rate, m³/s |
| $A_{device}$ | heat transfer area in the cooling device, m² |
| A | heat transfer area in heat exchanger, m² |
| $h_{l, device}$ | The averaged convective heat transfer coefficient of the cooling device using liquid, W/m²K |
| h | Convective heat transfer coefficient of heat exchanger, W/m²K |
| $R_{th}$ | Thermal resistance of the cooling device, ° C./W |
| NTU | Number of heat transfer unit |
| m | Mass flow rate, kg/s |
| ρ | Mass density, kg/m³ |
| Subscripts | |
| h | Hot side fluid of the heat exchanger |
| c | Cold side fluid of the heat exchanger |
| max | maximum |
| min | minimum |
| Superscripts | |
| (1) | Reference test case 1 |
| (2) | Reference test case 2 |

In one embodiment, the system runs both pumps 14 and 24 in a steady state with known pump speeds, which could be different from each other. Specifically, the hot-side pump 14 is set to a pump speed, $v_{pump,h}$ and the cold-side pump is set to a (same or different) pump speed, $v_{pump,c}$. While running, the battery module discharges battery energy (or draws battery energy) at a battery discharge current $I_{battery,dis}$. The system runs until it reaches a steady state. This process of running the system to a steady state is named "reference test case" in this disclosure. In one embodiment, this process may be performed one or more times. All the working parameters in the reference case can be obtained by using proper sensors, such as temperatures (e.g., battery temperature $T_{battery}$, and/or any of the liquid coolant temperatures described herein) by temperature sensor, liquid volumetric flow rate V by flow meter, or any other suitable sensor.

The following is a discussion of the five-step formula described herein. Although described in numerical order, in one embodiment, the steps do not necessarily need to be performed in order. For example, the steps may be performed out of order. As another example, at least some of the steps may be performed contemporaneously with one another. Specifically, each of the steps may be performed at the same time.

In one embodiment, a first step of the five-step formula is to determine the heat generation of the battery. In one embodiment, the battery discharge current $I_{battery,dis}$ and the temperature of coolant 25 before entering the heat exchanger from the supply line 23, $T_{c,in}$ are considered to be constraint conditions. These conditions may be monitored by sensors (not shown) that are implemented in the cooling system 10. The heat generation from the battery module $Q_{battery}$ thus may be determined by the battery discharge current $I_{battery,dis}$ and the internal resistance $R_{battery}$ $$Q_{battery} = I_{battery,dis}^2 R_{battery}, \quad (1)$$

In Reference test case 1, the formula may look like, $$R_{battery} = \frac{Q_{battery}^{(1)}}{(I_{battery,dis}^{(1)})^2}, \quad (2)$$

In one aspect, the internal resistance of the battery may remain constant. In another aspect, the internal resistance remains constant if the test case was performed within a threshold time period (e.g., one month). Substituting Equation (2) into Equation 91), the relation between $Q_{battery}$ and $I_{battery,dis}$ may be expressed as below, $$Q_{battery} = \frac{Q_{battery}^{(1)}}{(I_{battery,dis}^{(1)})^2} I_{battery,dis}^2. \quad (3)$$

In one embodiment, if the battery internal resistance is available prior to calculating Equation 2, the data in the reference case 1 may not be needed.

In one embodiment, a second step of the five-step formula is to derive the liquid flow rate of both pumps. The Affinity law applies to pumps, fans, and hydraulic turbines. In these rotary implementations, the Affinity law applies to centrifugal and axial flows. Based on the affinity law, once the working parameters, such as pump speeds (e.g., $v_{pump,h}^{(1)}$ and $v_{pump,c}^{(1)}$) and their corresponding liquid flow rates (e.g., $V_h^{(1)}$ and $V_c^{(1)}$, new pump speeds and new liquid flow rates (on the hot side and on the cold side) can be calculated by, $$\frac{v_{pump,h}}{v_{pump,h}^{(1)}} = \frac{V_h}{V_h^{(1)}} \quad (4)$$

$$\frac{v_{pump,c}}{v_{pump,c}^{(1)}} = \frac{V_c}{V_c^{(1)}} \quad (5)$$

In one embodiment, the Equations (4) and (5) assume pump efficiency remains constant.

In one embodiment, a third step of the five-step formula may include characterizing the thermal performance of a battery cooling device. For example, the battery cooling device may be the battery module, or more particularly the coolant tank 6 of the module. As another example, the characterization may be of at least a portion of the battery cooling system 10 (e.g., the battery module 2, the return line 12, the supply line 13, etc.). The hot liquid temperature $T_{h,out}$ is defined for the outlet liquid coolant 8 that exits the heat exchanger 3 into the supply line 13 before entering the coolant tank 6, meaning the coolant 8 has not extracted the heat generated by the battery yet. Substantially all the heat generated by the battery may be absorbed by the circulating coolant 8 in the primary cooling loop 26. The battery heat generation is expressed as $$Q_{battery} = \frac{(T_{battery} - T_{h,out})}{R_{th}} \quad (6)$$

Here, $R_{th}$ is the thermal resistance of the battery cooling device, which is a monotony decrease function of liquid flow rate $V_h$. $R_{th}$ represents the thermal resistance of the cooling device, and is determined for a given liquid flow rate. Thus, the relation between battery temperature and cold liquid temperature can be determined.

In the reference case (e.g., Reference test case 1), the thermal resistance of the cooling device may be expressed as, $$R_{th}^{(1)} = \frac{T_{battery}^{(1)} - T_{h,out}^{(1)}}{Q_{battery}^{(1)}} = \frac{1}{h_{l,device}^{(1)} A} \quad (7)$$

In one embodiment, the thermal resistance $R_{th}$ changes for different liquid flow rates. Thus, for a certain pump speed on the hot side 11 $v_{pump,h}$, the thermal resistance $R_{th}$ is expressed as $$R_{th} = \frac{1}{h_{l,device}^{(1)} A_{device}} \quad (8)$$

A is the heat transfer area in the cooling device, and in one embodiment A remains constant for different pump speeds. Now, for a new pump speed $v_{pump}$, a corresponding $R_{th}$ may be calculated. The theoretical correlations below are used to relate to the Reference test case 1, $$\frac{h_{l,device}}{h_{l,device}^{(1)}} = \left(\frac{V}{V^{(1)}}\right)^\eta = \left(\frac{v_{pump,h}}{v_{pump,h}^{(1)}}\right)^\eta \quad (9)$$

For a fully-developed flow, a well-accepted value of is 0.8. In another embodiment, of $\eta$ may be a different value.

Thus, the thermal resistance of the cooling device for an arbitrary pump speed $v_{pump,h}$ may be expressed as, $$R_{th} = \frac{h_{l,device}^{(1)}}{h_{l,device}} R_{th}^{(1)} = \left(\frac{v_{pump,h}^{(1)}}{v_{pump,h}}\right)^{0.8} R_{th}^{(1)}. \qquad (10)$$

Plugging Equation (10) into Equation (6), provides the relation as below that describes the heat transfer process in the battery cooling device, $$Q_{battery} = \left(\frac{v_{pump,h}}{v_{pump,h}^{(1)}}\right)^{0.8} \times \frac{(T_{battery} - T_{h,out})}{R_{th}^{(1)}}. \qquad (11)$$

In one embodiment, a forth step of the five-step formula may include determining the thermal performance characterization of a heat exchanger (e.g., the liquid-to-liquid heat exchanger 3). All of the heat generated by the battery is absorbed by the circulating coolant 8 in the primary cooling loop 26 and is rejected (or transferred) by the heat exchanger into the coolant 25 that is circulating within the secondary cooling loop 27. In one embodiment, the heat exchanger effectiveness is an indicator that represents its heat transfer performance. Based on the ε–NTU methodology, the heat exchanger effectiveness is expressed as below, $$\varepsilon = \frac{Q_{battery}}{C_{min}(T_{h,in} - T_{c,in})} \qquad (12)$$

where $$C_{min} = C_{h/c} = m_{h/c} \times c_{p_{h/c}} \qquad (13)$$

$C_{min}$ may be determined because it is related to material property of fluid or air (e.g., specific heat capacity $c_{p_{h/c}}$) and its mass flow rate $m_{h/c}$. To derive effectiveness ε, ε–NTU theoretical correlations for a counter flow heat exchanger are expressed as below, $$\varepsilon = \frac{1 - \exp[-NTU \times (1 - E)]}{1 - E \times \exp[-NTU \times (1 - E)]} \qquad (14)$$

where $$E = \frac{(mc_p)_h}{(mc_p)_c} = \frac{(\rho \times V \times c_p)_h}{(\rho \times V \times c_p)_c} \qquad (15)$$

In one embodiment, the value of NTU may be obtained using the relation below, $$\frac{1}{NTU} = C_{min}\left(\frac{1}{h_c A_c} + \frac{1}{h_h A_h}\right) \qquad (16)$$

Utilizing Equations (12)-(16), the value of E may be calculated, after the two Reference test cases (1 and 2) have been conducted. In one aspect, only one test case is needed. The derivation details are shown as follows:

In Reference test case 1, Equation (12) and Equation (14) become $$Q_{battery}^{(1)} = \varepsilon^{(1)} C_{min}^{(1)} \left(T_{h,in}^{(1)} - T_{c,in}^{(1)}\right) \qquad (17)$$

$$\varepsilon^{(1)} = \frac{1 - \exp[-NTU^{(1)} \times (1 - E^{(1)})]}{1 - E^{(1)} \times \exp[-NTU^{(1)} \times (1 - E^{(1)})]} \qquad (18)$$

where $$E^{(1)} = \frac{(mc_p)_h^{(1)}}{(mc_p)_c^{(1)}} \qquad (19)$$

Here, Equation (17) is in the equivalent form of Equation (12). The expressions generated from the Reference test case 2 may be in similar forms.

In one embodiment, since the liquid mass flow rates $m_c$, $m_h$ and other working parameters are known in the two reference cases, $\varepsilon^{(1)}$ and $\varepsilon^{(1)}$ can be calculated from Equation (17) and Equation (19). $\varepsilon^{(2)}$, $\varepsilon^{(2)}$ are available in a similar fashion. Then $NTU^{(1)}$ and $NTU^{(2)}$ may be solved from Equation (18) in reverse. Furthermore, Equation (16) becomes $$\frac{1}{NTU^{(1)}} = C_{min}\left[\frac{1}{h_c^{(1)} A_c} + \frac{1}{h_h^{(1)} A_h}\right] \qquad (20)$$

$$\frac{1}{NTU^{(2)}} = C_{min}\left[\frac{1}{h_c^{(2)} A_c} + \frac{1}{h_h^{(2)} A_h}\right] \qquad (21)$$

for the two reference test cases. In one embodiment, the heat transfer areas $A_h$ and $A_c$ do not change for different flow rates. In one embodiment, for the cold side of the heat exchanger, $$h_c^{(2)} = \left(\frac{m_c^{(2)}}{m_c^{(1)}}\right)^{0.8} h_c^{(1)}. \qquad (22)$$

In another embodiment, for the hot side of the heat exchanger, $$h_h^{(2)} = \left(\frac{m_h^{(2)}}{m_h^{(1)}}\right)^{0.8} h_h^{(1)}. \qquad (23)$$

Thus, solving Equation (20)-(23) simultaneously may lead to the solutions for $h_c^{(1)} A_c$, $h_h^{(1)} A_h$, $h_c^{(2)} A_c$ and $h_h^{(2)} A_h$, in terms of the test data which are measured in the two reference cases. In one embodiment, the multiplication of h and A may be treated as a whole variable, rather than each of them being solved separately.

In one embodiment, given a mass flow rate $m_c$ on the cold side and $m_h$ on the hot side, the corresponding effectiveness of heat exchanger, $\varepsilon(m_c, m_h)$, can be calculated as below.

For a counter-flow heat exchanger, $$\varepsilon(m_c, m_h) = \frac{1 - \exp[-NTU \times (1-E)]}{1 - E \times \exp[-NTU \times (1-E)]} \quad (24)$$

The value of NTU and E in Equation (24) may be calculated by $$\frac{1}{NTU} = \quad (25)$$

$$C_{min}\left[\frac{1}{(hA)_c} + \frac{1}{(hA)_h}\right] = C_{min}\left[\frac{1}{\left(\frac{m_c}{m_c^{(1)}}\right)^{0.8} h_c^{(1)} A_c} + \frac{1}{\left(\frac{m_h}{m_h^{(1)}}\right)^{0.8} h_h^{(1)} A_h}\right]$$

$$E = \frac{(mc_p)_h}{(mc_p)_c} = \frac{(\rho \times V \times c_p)_h}{(\rho \times V \times c_p)_c} \quad (26)$$

For a cross-flow heat exchanger, Equation (24) becomes the following:

$$\varepsilon(m_c, m_h) = 1 - \exp\left\{\frac{NTU^{0.22}}{E}[\exp(-E \times NTU^{0.78}) - 1]\right\} \quad (27)$$

Meanwhile, Equations (25) and 926) remain the same.

In one embodiment, the fifth step in the five-step formula includes predicting the battery temperature. Specifically, the energy balance equation regarding the temperature difference of hot and cold liquid for the battery heat generation is shown as below, $$Q_{battery} = c_{p,liquid} \times \rho_{liquid} \times V_h \times (T_{h,in} - T_{h,out}) \quad (28)$$

Plugging in Equation (4) into Equation (28), gives $$Q_{battery} = c_{p,liquid} \times \rho_{liquid} \times \frac{V_h^{(1)}}{v_{pump,h}^{(1)}} \times v_{pump,h} \times (T_{h,in} - T_{h,out}) \quad (29)$$

Therefore, for given pump speeds $v_{pump,h}$ and $v_{pump,c}$, a battery discharging current $I_{battery,dis}$ and the temperature $T_{c,in}$, solving Equation (3), (11)-(12), (24)-(26) and (29) simultaneously leads to the seven solutions of $\varepsilon$, $Q_{battery}$, $T_{battery}$, $T_{h,in}$, $T_{h,out}$, E and NTU. This is for a counter-flow heat exchanger. For a cross-flow heat exchanger, Equation (24) needs to be replaced by Equation (27).

From the above, the battery temperature may then be successfully estimated (or predicted). Specifically, the battery temperature (e.g., the temperature of the battery module 2) is a function, namely $f_c$, of the two pump speeds, battery discharging current $I_{battery,dis}$ and the cold-side liquid (coolant 25) temperature $T_{c,in}$, shown as below.

$$T_{battery}, f_c(v_{pump,c}, v_{pump,h}, I_{battery,dis}, T_{c,in}) \quad (30)$$

The overall objective function is the total power consumption of the pumps within the battery cooling system 10 (e.g., the hot-side pump 14 and the cold-side pump 24). The power consumption of the pumps may be obtained using the test data in one or more of the Reference test cases. Based on the Affinity law, $$P_{pump,c} = \left(\frac{v_{pump,c}}{v_{pump,c}^{(1)}}\right)^3 P_{pump,c}^{(1)} \quad (31)$$

$$P_{pump,h} = \left(\frac{v_{pump,h}}{v_{pump,h}^{(1)}}\right)^3 P_{pump,h}^{(1)} \quad (32)$$

In one embodiment, it is assumed that the pump efficiency remains constant.

Practically, the constraints are developed to meet the requirements of temperature, and pump speed working range.

$$T_{battery} \leq T_{battery,max} \quad (33)$$

$$v_{pump,c,min} \leq v_{pump,c} \leq v_{pump,c,max} \quad (34)$$

$$v_{pump,h,min} \leq v_{pump,h} \leq v_{pump,h,max} \quad (35)$$

Applying Equation (30) into inequality (33), the constraint model for or $f_c$ is developed as below $$f_c(v_{pump,c}, v_{pump,h}, I_{battery,dis}, T_{c,in}) - T_{battery,max} \leq 0 \quad (36)$$

Thus, the performance constraint includes maintaining a temperature of the battery module to be less than or equal to the maximum battery temperature (e.g., 70° C.). In one embodiment, the inequality may be based on a temperature threshold that is different than the maximum battery temperature in order to ensure that there is little chance of overshoot.

The control variable vector is formed as, $$\vec{x} = \begin{pmatrix} v_{pump,c} \\ v_{pump,h} \end{pmatrix}$$

The objective function may be defined as the sum of power consumed by the liquid pumps in the system 10 (e.g., pump 14 and pump 24). Thus, the function may be defined as $$f_{obj}(\vec{x}) = P_{pump,c} + P_{pump,h} \quad (37)$$

The performance constraints may be converted to a group of inequalities, such as $$\vec{g}(\vec{x}) = \quad (38)$$

$$\begin{pmatrix} g_1(\vec{x}) \\ g_2(\vec{x}) \\ g_3(\vec{x}) \\ g_4(\vec{x}) \\ g_5(\vec{x}) \end{pmatrix} = \begin{pmatrix} f_0(v_{pump,c}, v_{pump,h}, I_{battery,dis}, T_{c,in}) - T_{battery,max} \\ v_{pump,c,min} - v_{pump,c} \\ v_{pump,c} - v_{pump,c,max} \\ v_{pump,h,min} - v_{pump,h} \\ v_{pump,h} - v_{pump,h,max} \end{pmatrix} \leq \vec{0}$$

Therefore, this becomes an optimal controller, to: minimize the variable: $f_{obj}(\vec{x})$, subject to Formula (38), $\vec{g}(\vec{x}) < \vec{0}$. Specifically, the controller 5 is configured to optimize the objective function by minimizing a sum of power consumed by the pumps in view of one or more performance constraints within Formula (38). Since the objective function $f_{obj}(\vec{x})$ is a convex function, the controller design may become a convex optimization. Within the bounded range of both pump speeds, there may be a minimizer vector $\vec{x}^*$ to let $f_{obj}(\vec{x}*)$ reach the lowest point. In one embodiment, the battery starts discharging when battery energy is needed (e.g., a load is no longer receiving power from the AC mains). Both pumps, Pump 14 and Pump 24, are set at an initial pump speed. In one embodiment, the initial pump speed is a predefined speed, such as the maximum pump speed. Then the (thermal management and power optimization algorithm running in the) controller 5 receives battery discharge current from the battery module 2 and the inlet cold side temperature of the liquid coolant 25 (e.g., from a temperature sensor). Having these dynamic constraint parameters, an optimal control function may be generated, and therefore the optimal pump speeds can be obtained. When the battery stops discharging, the pumps will also stop functioning. This may be accomplished via any suitable method, such as a sensor or a circuit that opens once the battery stops discharging.

Figure 2:
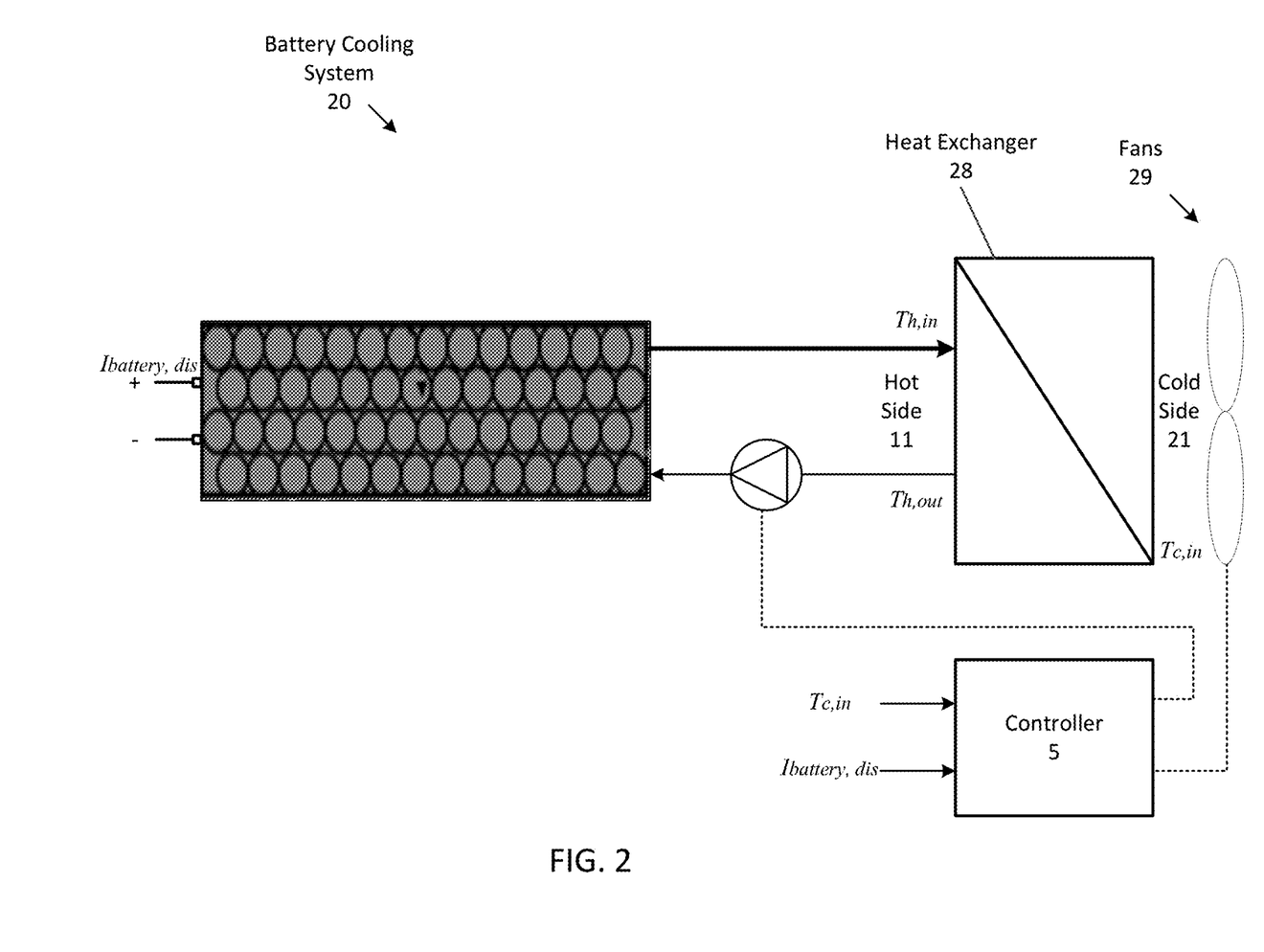
FIG. 2 is another example of a battery cooling system according to one embodiment.

FIG. 2 shows another example of a battery cooling system according to one embodiment. Specifically, this figure illustrates a battery cooling system 20 that is similar to the system 10 of FIG. 1, except that the system includes an air-to-liquid heat exchanger 28, rather than a liquid-to-liquid heat exchanger 3. Also, rather than having the cold-side pump 24, this system includes one or more fans 29 that are configured to move air and facilitate the heat transfer performed by the heat exchanger. In one embodiment, data center cooling air (e.g., lower-temperature air centrally supplied in a data center) is used to cool the heat exchanger.

In one embodiment, the operations performed here by the controller 5 for thermal management and power optimization may be performed using the pump and fan. Specifically, pump speed $v_{pump,c}$ of the cold-side pump 24 may be replaced by the fan speed, $v_{fan}$, of the one or more fans 29, and the fan speed and the pump speed of the hot-side pump may be optimally controlled by the controller 5 using the algorithm (e.g., at least a portion of the five-step formula) described herein.

Figure 3:
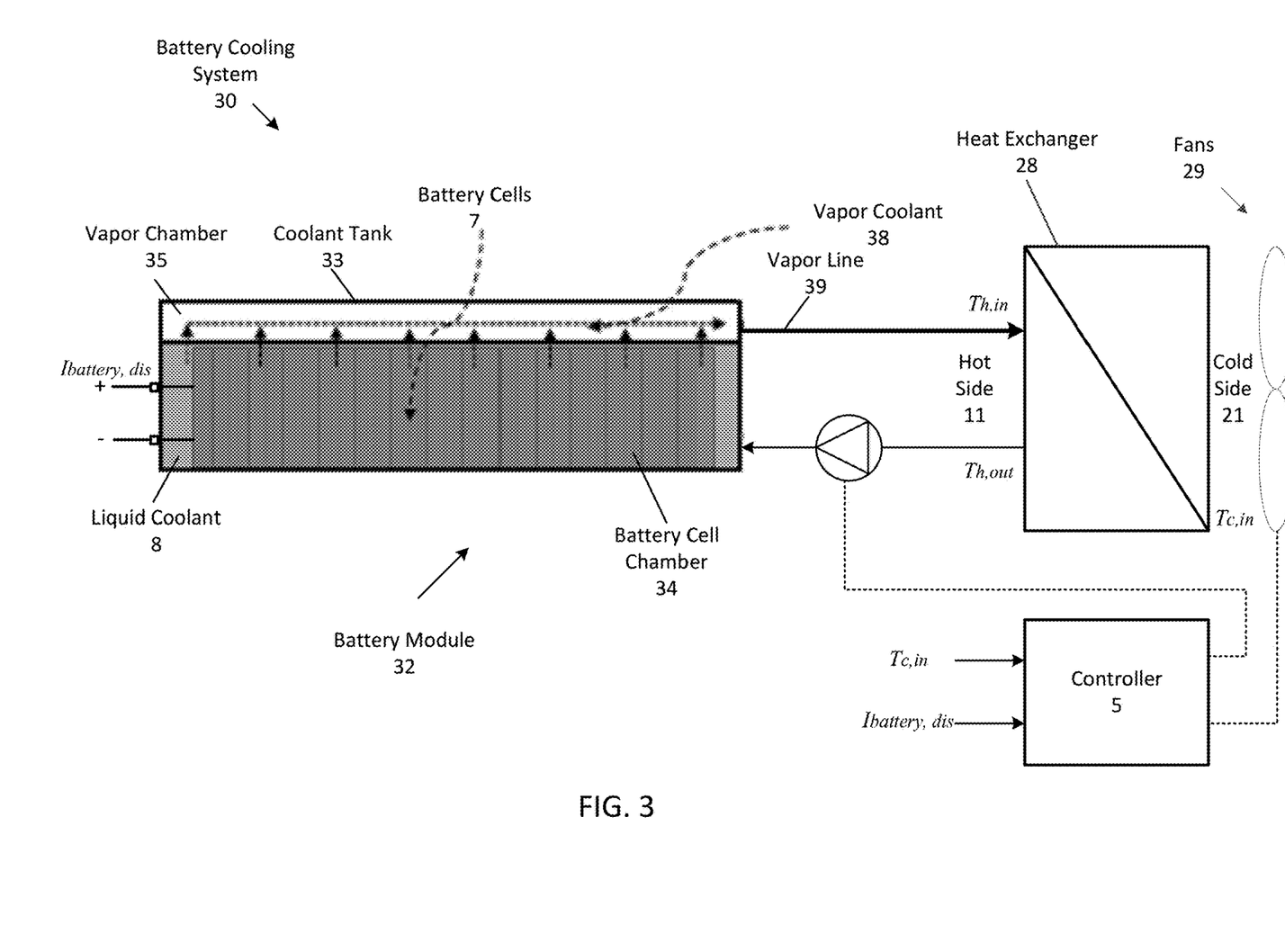
FIG. 3 is another example of a battery cooling system according to one embodiment.

FIG. 3 shows another example of a battery cooling system according to one embodiment. Specifically, this figure illustrates a two-phase battery cooling system 30 that includes a battery module 32, an air-to-liquid heat exchanger 28, one or more fans 29, and a controller 5. The battery module 32 includes a coolant tank 33 with two chambers: a battery cell chamber 34 that includes one or more battery cells 7 that are at least partially submerged in the liquid coolant 8 and a vapor chamber 35 that does not include the liquid coolant 8 but is configured to collect vapor coolant 38. When the battery cells 7 generate heat (e.g., during discharge), the liquid coolant 8 extracts the heat from the battery cells, and the coolant changes from a liquid phase to a vapor phase. The low density vapor coolant 38 ascends in the tank and into the vapor chamber 35. The vapor travels to the heat exchanger through a vapor return line 39. Similar to the battery cooling system 20 of FIG. 2, this system 30 also includes the air-to-liquid heat exchanger 28 and fans 29. Thus, the fan speed and pump speed may be optimally controlled by the controller as described herein.

Figure 4:
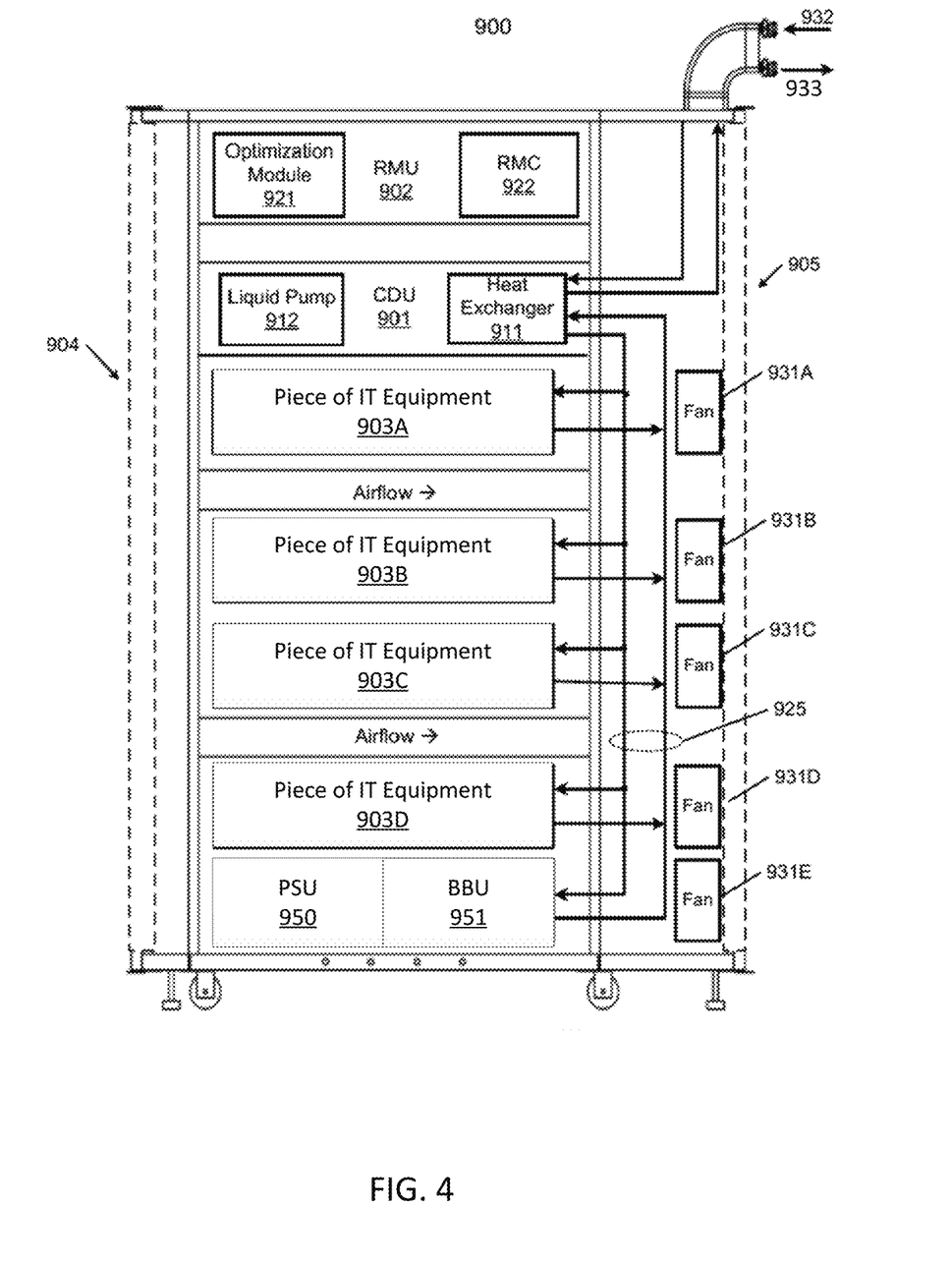
FIG. 4 shows an example of an electronic rack according to one embodiment.

FIG. 5 is a block diagram illustrating an example of an electronic rack according to one embodiment. Electronic rack 900 may include one or more server slots to contain one or more servers respectively. Each server includes one or more information technology (IT) components (e.g., processors, memory, storage devices, network interfaces). According to one embodiment, electronic rack 900 includes, but is not limited to, CDU 901, rack management unit (RMU) 902 (optional), a power supply unit (PSU) 950, the BBU 951 (which may include one or more battery modules), and one or more pieces of IT equipment (or IT equipment) 903A-903D, which may be any type of IT equipment, such as server blades. The IT equipment 903 can be inserted into an array of server slots respectively from frontend 904 or backend 905 of electronic rack 900. The PSU 950 and/or BBU 951 may be inserted into any of server slots 903 within the electronic rack 900. In one embodiment, one or more BBUs may be inserted into any of server slots 903 within the electronic rack 900.

Note that although there are only four pieces of IT equipment 903A-903D shown here, more or fewer pieces of IT equipment may be maintained within electronic rack 900. Also note that the particular positions of CDU 901, RMU 902, PSU 950, BBU 951, and IT equipment 903 are shown for the purpose of illustration only; other arrangements or configurations of CDU 901, RMU 902, BBU 951, and pieces of IT equipment 903 may also be implemented. Note that electronic rack 900 can be either open to the environment or partially contained by a rack container, as long as the cooling fans can generate airflows from the frontend to the backend.

In addition, a fan module can be associated with each of the pieces of IT equipment 903, and the BBU 951. In this embodiment, fan modules 931A-931E, collectively referred to as fan modules 931, and are associated with the pieces of IT equipment 903A-903D, respectively. Each of the fan modules 931 includes one or more cooling fans. Fan modules 931 may be mounted on the backends of IT equipment 903 and/or BBU 951 to generate airflows flowing from frontend 904, traveling through the air space of the IT equipment 903, and existing at backend 905 of electronic rack 900. In one embodiment, each of the fan modules may be mounted on the backends of the pieces of IT equipment 903 and one or more BBU 951. In another embodiment, one or more of the fan modules may be positioned on the frontend 904 of the rack 900. Such frontend fans may be configured to push air into the pieces of IT equipment 903 and/or the BBU 951.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid return/supply lines 932-933 to form a primary loop. The connectors coupled to the external liquid return/supply lines 932-933 may be disposed or mounted on backend 905 of electronic rack 900. The liquid return/supply lines 932-933 are coupled to a set of room manifolds, which are coupled to an external heat removal system, or extremal cooling loop. In addition, heat exchanger 911 further includes a second loop with two ports having a second pair of liquid connectors coupled to liquid manifold 925 to form a secondary loop, which may include a supply manifold to supply cooling liquid to the pieces of IT equipment 903 and a return manifold to return warmer liquid back to CDU 901. Note that CDUs 901 can be any kind of CDUs commercially available or customized ones. Thus, the details of CDUs 901 will not be described herein.

Each of the pieces of IT equipment 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. IT equipment 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

In one embodiment, the BBU 951 is configured to provide backup power (e.g., drawing battery energy from one or more battery modules contained therein) to the rack (e.g., one or more pieces of IT equipment 903) when the rack is not drawing power from a main power source, such as during a black out. In one aspect, the BBU 951 may include one or more of the battery modules (e.g., battery module 2) described herein.

Electronic rack 900 further includes optional RMU 902 configured to provide and manage power supplied to servers 903, fan modules 931, and CDU 901. Optimization module 921 and RMC 922 can communicate with a controller in some of the applications. RMU 902 may be coupled to PSU 950 to manage the power consumption of the PSU. The PSU 950 may include the necessary circuitry (e.g., an alternating current (AC) to direct current (DC) or DC to DC power converter, backup battery, transformer, or regulator, etc.,) to provide power to the rest of the components of electronic rack 900.

In one embodiment, RMU 902 includes optimization module 921 and rack management controller (RMC) 922. RMC 922 may include a monitor to monitor operating status of various components within electronic rack 900, such as, for example, computing nodes 903, CDU 901, and fan modules 931. Specifically, the monitor receives operating data from various sensors representing the operating environments of electronic rack 900. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. In one embodiment, the RMC 922 may monitor power consumption of various components of the rack. For example, the RMC 922 may monitor battery energy being provided by the BBU 951, while the BBU is active (e.g., providing backup battery power). For instance, the RMC 922 may obtain current data that represents the current discharge of the BBU from a current sensor. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Although illustrated as having only one pump, the CDU may include two or more pump, as described herein. For instance, the liquid pump 912 may facilitate the circulation of coolant between the heat exchanger the BBU 951 and/or one or more pieces of IT equipment (e.g., a hot-side pump 14), while the CDU may include another pump (e.g., a cold-side pump 24) to facilitate the circulation of coolant between the heat exchanger and an external heat removal system. Thus, the optimization module 921 may perform one or more operations of the thermal management and power optimization algorithm that optimizes the energy cost of powering the liquid pumps within given constraints, as described herein. In one embodiment, Once the optimal pump speed and optimal fan speeds have been determined, RMC 922 configures liquid pump(s) and/or cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

Note that some or all of the IT equipment 903 (e.g., 903A, 903B, 903C, and/or 903D) may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled.

Figure 5:
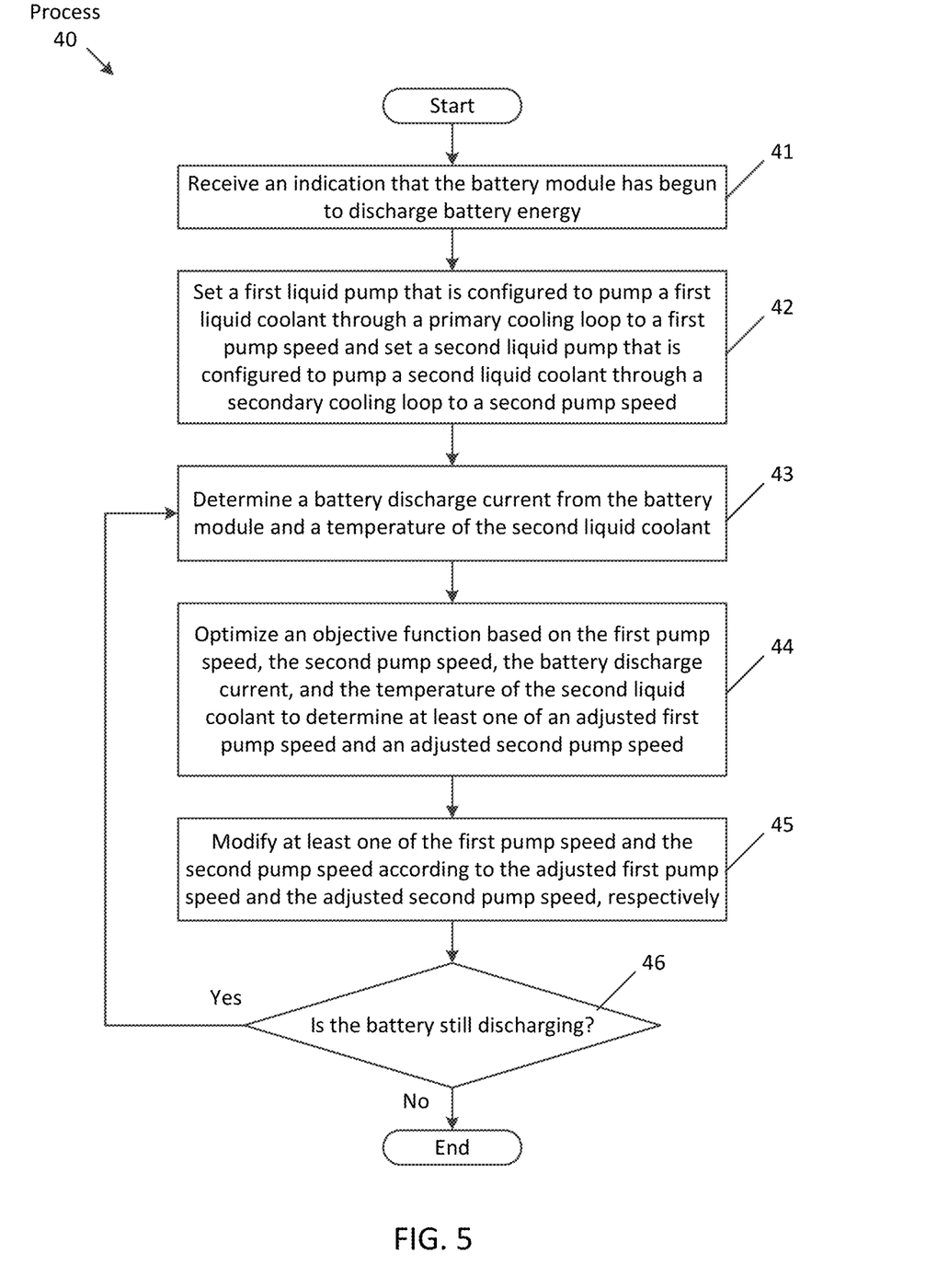
FIG. 5 is a flowchart of a process for controlling liquid pumps of a battery cooling system according to one embodiment.

FIG. 5 is a flowchart of a process 40 for controlling liquid pumps of a battery cooling system according to one embodiment. Specifically, the process 40 may be performed by (e.g., a thermal management and power optimization algorithm executing on) the controller 5 of the battery cooling system described herein. In one embodiment, the process 40 may be performed by the RMU 902 of the electronic rack. The process 40 begins by receiving an indication that the battery module has begun to discharge battery energy (at block 41). For instance, the controller 5 may detect that current has begun to be discharged from the battery (e.g., via a current sensor). As another example, the controller may receive an indication from the PSU 950 that the rack is no longer receiving power from the AC mains. The process 40 sets a first liquid pump that is configured to pump a first liquid coolant through a primary cooling loop to a first pump speed and set a second liquid pump that is configured to pump a second liquid coolant through a secondary cooling loop to a second pump speed (at block 42). For example, referring to FIG. 1, the hot-side pump 14 is set to a first pump speed and the cold-side pump 24 is set to a second pump speed. In one embodiment, both speeds may be the same or different. In another embodiment, this initial speed is the maximum operational speed of both pumps.

The process 40 determines a battery discharge current from the battery module and a temperature of the second liquid coolant (at block 43). Specifically, the temperature of the coolant is the inlet temperature $T_{c,in}$, which is the temperature of the coolant before the heat exchanger transfers heat from the first liquid coolant into the second liquid coolant. In one embodiment, the temperature may be the outlet temperature, $T_{c,out}$. In one embodiment, the controller may receive this data via sensors (e.g., a current sensor and a temperature sensor). The process 40 optimizes an objective function based on the first pump speed, the second pump speed, the battery discharge current, and the temperature of the second liquid coolant to determine at least one of an adjusted first pump speed and an adjusted second pump speed (at block 44). As described herein, the objective function is optimized to minimize the sum of power consumed by the pumps in view of one or more performance constraints, which include maintaining the temperature of the battery module below (or equal to) a threshold temperature. To meet this constraint, the controller determines the temperature of the battery module as a function of the pump speeds, the current, and inlet temperature. As a result, the optimization of the objective function includes maintaining the battery module temperature below the threshold temperature without performing a direct temperature measurement (e.g., via a temperature sensor) of the battery module.

The process 40 modifies at least one of the first pump speed and the second pump speed according to the adjusted first pump speed and the adjusted second pump speed, respectively (at block 45). Specifically, if it is determined that the adjusted pump speed is different than the previously set speed, the controller 5 transmits a control signal to the corresponding pump in order for the pump to change its pump speed accordingly. The process 40 determines if the battery is still discharging (at decision block 46). If so, the process 40 returns to block 43 in order to repeat the operations starting from block 43. Thus, the process 40 will iteratively perform the operations of blocks 43 through 45 while the battery module discharges battery energy in order to ensure that the temperature of the battery module is maintained below the threshold temperature, and in order to optimize power consumption.

If, however, the battery stops discharging, the process 40 ends. In one embodiment, once the battery stops discharging the controller 5 may transmit control signals to the pumps to stop the pumps.

Some embodiments may perform variations to the processes described herein. For example, the specific operations of at least some of the processes may not be performed in the exact order shown and described. The specific operations may not be performed in one continuous series of operations and different specific operations may be performed in different embodiments. For example, rather than performing the process to optimize pump speeds of two pumps, the process may be performed to optimize a pump speed of a pump (e.g., a hot-side pump) and a fan speed of one or more fans, as described herein. In one embodiment, the process may be performed in response to the controller receiving other indications of the status of the battery module. For example, the battery module is also configured to charge the battery cells by drawing power from an external power source (e.g., the AC mains). When charging, the battery module may produce heat. Thus, the process may begin upon the controller receiving an indication that the module is charging the battery cells. In this embodiment, rather than determining the discharge current at block 43, the charging current may be determined.

As previously explained, an embodiment of the disclosure may be (or include) a non-transitory machine-readable medium (such as microelectronic memory) having stored thereon instructions, which program one or more data processing components (generically referred to here as a "processor") to perform thermal management and/or pump/fan optimization operations, such as controlling pumps and/or fans, as described herein. In other embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method for controlling a. plurality of liquid pumps of a. battery cooling system that includes a battery module that has a set of battery cells and a liquid-to-liquid heat exchanger, the method comprising:
in response to an indication that the battery module has begun to discharge battery energy stored in the set of battery cells to a load,
setting a first pump speed for a first liquid pump that is configured to circulate a first liquid coolant that at least partially submerges the battery cells and is warmed by heat generated by the battery cells into a hot side of the liquid-to-liquid heat exchanger, and
setting a second pump speed for a second liquid pump that is configured to circulate a second liquid coolant into a cold side of the liquid-to-liquid heat exchanger, wherein the heat exchanger is configured to transfer heat from the first liquid coolant into the second liquid coolant;
determining a battery discharge current from the battery module and a temperature of the second liquid coolant;
determining at least one of an adjusted first pump speed and an adjusted second pump speed by optimizing a sum of power consumed by the first and second liquid pumps based on the first pump speed, the second pump speed, the battery discharge current, and the temperature of the second liquid coolant; and modifying at least one of the first pump speed and the second pump speed according to the adjusted first pump speed and the adjusted second pump speed, respectively.

2. The method of claim 1, wherein optimizing comprises minimizing the sum of power consumed by the first liquid pump and the second liquid pump in view of one or more performance constraints.

3. The method of claim 2., wherein the one or more performance constraints comprise maintaining a temperature of the battery module below a threshold temperature.

4. The method of claim 3, wherein the temperature of the battery module is a function of the first pump speed, the second pump speed, the battery discharge current, and the temperature of the second liquid coolant.

5. The method of claim 3 further comprising iteratively performing the determining the battery discharge current and the temperature, the determining the adjusted first and second pumps speeds, and the modifying the first and second pump speeds, while the battery module discharges battery energy in order to ensure that, the temperature of the battery module is maintained below the threshold temperature.

6. The method of claim 1, wherein the battery module is a battery backup unit (BBU) in a data center that is configured to provide battery backup power to one or more pieces of IT equipment.

7. The method of claim 1 further comprising measuring the temperature of the second liquid coolant before the liquid-to-liquid heat exchanger transfers heat from the first liquid coolant into the second liquid coolant.

8. The method of claim 1, wherein optimizing comprises maintaining a battery module temperature below a threshold temperature without performing a direct temperature measurement of the battery module.

9. A battery cooling system comprising:
a battery module that includes a set of battery cells that are at least partially submerged within a first liquid coolant;
a liquid-to-liquid heat exchanger;
a first liquid pump that is configured to circulate the first liquid coolant from the battery module into a hot side of the liquid-to-liquid heat exchanger;
a second liquid pump that is configured to circulate a second liquid coolant from an external cooling source into a cold side of the liquid-to-liquid heat exchanger;
at least one processor; and
memory having a set of instructions stored therein which when executed by the at least one processor cause the battery cooling system to
in response to an indication that the battery cells are providing battery energy to a. load, which causes heat generated by the battery cells to warm the first liquid coolant, set the first liquid pump to a first pump speed and set the second liquid pump to a second pump speed to cause the liquid-to-liquid heat exchanger to transfer heat from the first liquid coolant into the second liquid coolant;
determine a battery discharge current from the battery module and a temperature of the second liquid coolant;
determine at least one of an adjusted first pump speed and an adjusted second pump speed by optimizing a sum of power consumed by the first and second liquid pumps based on the first pump speed, the second pump speed, the battery discharge current, and the temperature of the second liquid coolant; and
modify at least one of the first pump speed and the second pump speed according to the adjusted first pump speed and the adjusted second pump speed, respectively.

10. The battery cooling system of claim 9, wherein optimizing comprises minimizing the sum of power consumed by the first liquid pump and. the second liquid pump in view of one or more performance constrains.

11. The battery cooling system of claim 10, wherein the one or more performance constraints comprise maintaining a temperature of the battery module below a threshold temperature.

12. The battery cooling system of claim 11, wherein the temperature of the battery module is a function of the first pump speed, the second pump speed, the battery discharge current, and the temperature of the second liquid coolant.

13. The battery cooling system of claim 11, wherein the memory has further instructions to iteratively perform the instructions to 1) determine the battery discharge current and the temperature, 2) determine the adjusted first and second pump speeds, and 3) modify the first and second pump speeds, while the battery module discharges battery energy in order to ensure that the temperature of the battery module is maintained below the threshold temperature.

14. The battery cooling system of claim 9, wherein the battery module is a battery backup unit (BBU) in a data center that is configured to provide battery backup power to one or more pieces of IT equipment.

15. The battery cooling system of claim 9, wherein the memory has further instructions to measure the temperature of the second liquid coolant before the liquid-to-liquid heat exchanger transfers heat from the first liquid coolant into the second liquid coolant.

16. The battery cooling system of claim 9, wherein optimizing comprises maintaining a battery module temperature below a threshold temperature without performing a direct temperature measurement of the battery module.

17. A non-transitory machine-readable medium having instructions stored therein, which when executed by a processor causes the processor to perform operations for controlling a plurality of liquid pumps of a battery cooling system that includes a battery module that has a set of battery cells and a liquid-to-liquid heat exchanger, the operations comprising:
in response to an indication that the battery module has begun to discharge battery energy stored in the set of battery cells to a load,
setting a first pump speed for a first liquid pump that is configured to circulate a first liquid coolant that at least partially submerges the battery cells and is warmed by heat generated by the battery cells of the battery module into a hot side of the liquid-to-liquid heat exchanger, and
setting a second pump speed for a second liquid pump that is configured to circulate a second liquid coolant into a cold side of the liquid-to-liquid heat exchanger, wherein the heat exchanger is configured to transfer heat from the first liquid coolant into the second liquid coolant;
determining a battery discharge current from the battery module and a temperature of the second liquid coolant;
determining at least one of an adjusted first pump speed and an adjusted second pump speed by optimizing a sum of power consumed by the first and second liquid pumps based on the first pump speed, the second pump speed, the battery discharge current, and the temperature of the second liquid coolant; and modifying the first pump speed and the second pump speed according to the adjusted first pump speed and the adjusted second pump speed, respectively.

18. The machine-readable medium of claim 17, wherein optimizing comprises minimizing the sum of power consumed by the first liquid pump and. the second liquid pump in view of one or more performance constraints.

19. The machine-readable medium of claim 18, wherein the one or more performance constraints comprise maintaining a temperature of the battery module below a threshold temperature.

20. The machine-readable medium of claim 19, wherein the temperature of the battery module is a function of the first pump speed, the second pump speed, the battery discharge current, and the temperature of the second liquid coolant.

* * * * *